United States Patent [19]
Janniro et al.

[11] Patent Number: 5,634,098
[45] Date of Patent: May 27, 1997

[54] METHOD AND APPARATUS FOR ENVIRONMENT-VARIABLE DRIVEN SOFTWARE TESTING

[75] Inventors: Micheal E. Janniro, Mountain View; Robert B. Jervis, Monte Sereno; Donald G. Miller, Jr., Los Altos, all of Calif.

[73] Assignee: Sun Microsystems, Inc., Mountain View, Calif.

[21] Appl. No.: 384,318

[22] Filed: Feb. 1, 1995

[51] Int. Cl.$^6$ .................................................. G06F 11/34
[52] U.S. Cl. .................. 395/183.14; 395/183.07; 395/615
[58] Field of Search .................... 395/183.14, 183.13, 395/700, 650, 600, 183.01, 183.02

[56] References Cited

U.S. PATENT DOCUMENTS

| | | | |
|---|---|---|---|
| 4,825,354 | 4/1989 | Agrawal et al. | 395/600 |
| 4,945,475 | 7/1990 | Bruffey et al. | 395/600 |
| 5,021,997 | 6/1991 | Archie et al. | 395/183.07 |
| 5,182,806 | 1/1993 | McKeeman et al. | 395/700 |
| 5,230,049 | 7/1993 | Chang et al. | 395/700 |
| 5,274,803 | 12/1993 | Dubin et al. | 395/600 |
| 5,414,836 | 5/1995 | Baer et al. | 395/183.14 |
| 5,421,004 | 5/1995 | Carpenter et al. | 395/183.01 |

OTHER PUBLICATIONS

Robert Cowart, "Mastering Windows™3.1", Sybex Inc., Alameda CA, 1993, p. 109.

*Primary Examiner*—Hoa T. Nguyen
*Assistant Examiner*—Ly V. Hua
*Attorney, Agent, or Firm*—Blakely Sokoloff Taylor & Zafman LLP

[57] ABSTRACT

An apparatus and method for testing software is disclosed. A test base is constructed on a storage device by creating a plurality of directories connected to form a hierarchical directory structure. Files associated with software programs to be tested are stored in directories within the hierarchical directory structure. Such files may include source code files, test input files and expected output files. Environment files and environment configuration files that specify values for environment variables are also stored in the test base. A test is run by invoking a test engine and passing to the test engine the name of an environment file and the name of a test. The test engine modifies the values of environment variables based on the specified environment file prior to executing the specified test. After modifying the environment based on the specified environment file and prior to executing the test, the test engine further modifies the environment based on any applicable environment configuration files. The test engine determines which environment configuration files are applicable to a test based on the location of the environment configuration files in the test base relative to the location of the directory that contains the files associated with the test. In addition to single test operations, the test engine may perform a series of tests based on a test list. The test apparatus also includes a tool for storing the results of past tests, and a tool for generating test lists in which tests are ordered based on the results of past tests. Multiple tests are performed simultaneously by distributing the test processes among a plurality of processors.

36 Claims, 8 Drawing Sheets

METHOD AND APPARATUS FOR ENVIRONMENT-VARIABLE DRIVEN SOFTWARE TESTING

FIELD OF THE INVENTION

The present invention relates to a method and apparatus for testing software, and more specifically, to a method and apparatus for performing automated software testing based on the values of environment variables specified in files stored in a hierarchical directory structure.

BACKGROUND OF THE INVENTION

As society becomes increasingly dependent on computers, it becomes increasingly important to detect and eliminate errors in the software executed by the computers. To detect errors, software developers typically run the software through a series of tests.

Software tests may be performed manually or automatically. Manual testing requires a user to enter test input during the testing process. As the user enters test input, the user notes how the computer system responds to the test input. If the computer system responds as expected, then the software passes the test. Otherwise, the software does not pass the test. Manual testing has the disadvantage that it involves a great deal of time and human resources. Further, repeat tests require approximately the same amount of time to perform as the original tests. Finally, notes made by the user during testing are often the only documentation of which tests were performed and what the results were.

For automated testing, a user prepares an input file with test input. The software to be tested reads test input from the input file and generates output based on the test input. The output can then be compared to expected output. If the actual output matches the expected output, then the software passes the test, otherwise it fails. Automated testing has numerous benefits over manual testing. For example, once a test input file and an expected output file have been prepared, virtually no additional user time is required to perform repeat tests. Further, the input test file serves to document which tests are run, and the generated output file serves to document the results of the tests.

The results of automated tests may be affected by the system environment in which the testing occurs. For example, two software programs compiled from the same source code may generate different outputs based on the same input if different compiler options were used to compile the two software programs. Testing may also be affected by the value of other environment parameters, such as the value of the "PATH" variable that is in effect when a testing operation is performed.

Consequently, testing operations that do not take into account the computer environment at the time of testing may yield inaccurate or inconsistent results. Therefore, it is clearly desirable to provide a method and apparatus for testing software that allows the tester to select different system environments. It is further desirable to provide a method and apparatus that establishes predefined system environments as part of an automated testing process.

SUMMARY OF THE INVENTION

According to one embodiment of the invention, an apparatus and method for testing software is provided. The apparatus performs the tests based on files contained in a test base. The test base is constructed on a storage device by creating a plurality of directories connected to form a hierarchical directory structure. Files associated with software programs to be tested are stored in directories within the hierarchical directory structure. Such files may include source code files, test input files and expected output files.

Environment files and environment configuration files that specify values for environment variables are also stored in the test base. In one embodiment, the environment files are stored in a single environment directory. The location of the environment configuration files within the test base depends on the tests to which they apply.

To run a single test, a test engine is invoked and passed the name of an environment file and the name of a test. The test engine modifies the values of environment variables based on the specified environment file prior to executing the specified test. After modifying the environment based on the specified environment file and prior to executing the test, the test engine further modifies the environment based on any applicable environment configuration files.

The test engine determines which environment configuration files are applicable to a test based on the location of the environment configuration files in the test base relative to the location of the directory that contains the files associated with the test. According to one embodiment, the environment configuration files located (1) in the directory associated with the specified test and (2) in directories above the directory associated with the specified test are processed prior to the specified test.

In addition to single test operations, the test engine may perform a series of tests based on a test list. The test apparatus also includes a tool for storing the results of past tests, and a tool for generating test lists in which tests are ordered based on the results of past tests. Multiple tests are performed simultaneously by distributing the test processes among a plurality of processors.

According to one aspect of the invention, an apparatus for performing a test on software in a computer system is provided. The computer system has an initial environment. The apparatus includes a storage device containing a test base. The test base includes a plurality of directories connected to form a hierarchical directory structure. The plurality of directories includes a test directory corresponding to the test. A plurality of environment configuration files are stored in the plurality of directories.

The apparatus also includes a processor coupled to the storage device and a test engine executing on the processor. The test engine determines which environment configuration files of the plurality of environment configuration are applicable environment configuration files. Applicable environment configuration files are environment configuration files that apply to the test. The test engine determines the applicable environment configuration files based on where the plurality of environment configuration files are stored in the plurality of directories relative to the test directory.

The test engine modifies the initial environment to create a modified environment based on the applicable environment configuration files. The test engine then causes the software to be tested in the modified environment.

According to another aspect of the invention, a method for performing a test on software in a specified environment in a computer system is provided. The computer system includes a storage device containing a test base. The test base includes a plurality of directories connected to form a hierarchical directory structure. A first directory of the plurality of directories corresponds to the test to be performed. A plurality of environment configuration files are stored in the plurality of directories.

The method includes the step of determining which of the plurality of environment configuration files are applicable environment configuration files based on where the plurality of environment configuration files are located in the hierarchical directory structure relative to the first directory. After the applicable environment configuration files are determined, the specified environment is created based on the applicable environment configuration files. Once the modification of the environment has been competed, the software is tested in the specified environment.

According to yet another aspect of the invention, a method for constructing a test base on a storage device is provided. The method includes the creating the data structure for the test base and storing files the files required for the tests in the appropriate locations within the data structure.

Specifically, the method includes creating a plurality of directories on the storage device. The plurality of directories are connected to form a hierarchical directory structure. A first directory of the plurality of directories corresponds to a first test, and a second directory of the plurality of directories corresponds to a second test.

A plurality of environment configuration files are stored in the plurality of directories. The environment configuration files include a first set of environment configuration files that apply to the first test but not the second test, a second set of environment configuration files that apply to the second test but not the first test, and a third set of environment configuration files that apply to both the first test and the second test.

More specifically, the environment configuration files of the first set of environment configuration files are stored in either the first directory or in directories of the plurality of directories that are ancestors of the first directory but not ancestors of the second directory. The environment configuration files of the second set of environment configuration files are stored in either the second directory or in directories of the plurality of directories that are ancestors of the second directory but not ancestors of the first directory. The environment configuration files of the third set of environment configuration files are stored in directories of the plurality of directories that are ancestors of both the first directory and the second directory.

According to another aspect of the invention, a method for performing a second series of tests on a plurality of software programs based on results of a first series of tests performed on the plurality of software programs is provided. The method includes the computer implemented steps of performing the first series of tests, storing the results of the first series of tests, constructing a test list based on the results, and performing the second series of tests in the order specified in the test list.

Specifically, each test of the first series of tests is performed on a specified software/environment combination. Each software/environment combination includes a specified software program of the plurality of software programs and a specified environment of a plurality of predefined environments.

Result data indicating results of the first series of tests is stored on a storage device. The result data includes data indicating whether a most recent performance of each test of the first series of tests was successful. The result data is then read from the storage device.

A test list is generated based on the result data. The test list includes an ordered list of entries. Each entry of the test list represents a test performed in the first series of tests. Each entry in the list of entries is ordered based on the outcome, during the first series of tests, of the test represented by the entry.

The second series of tests is performed based on the test list. Specifically, the tests represented in the test list are performed in the order of their corresponding entries in the test list.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for testing software is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
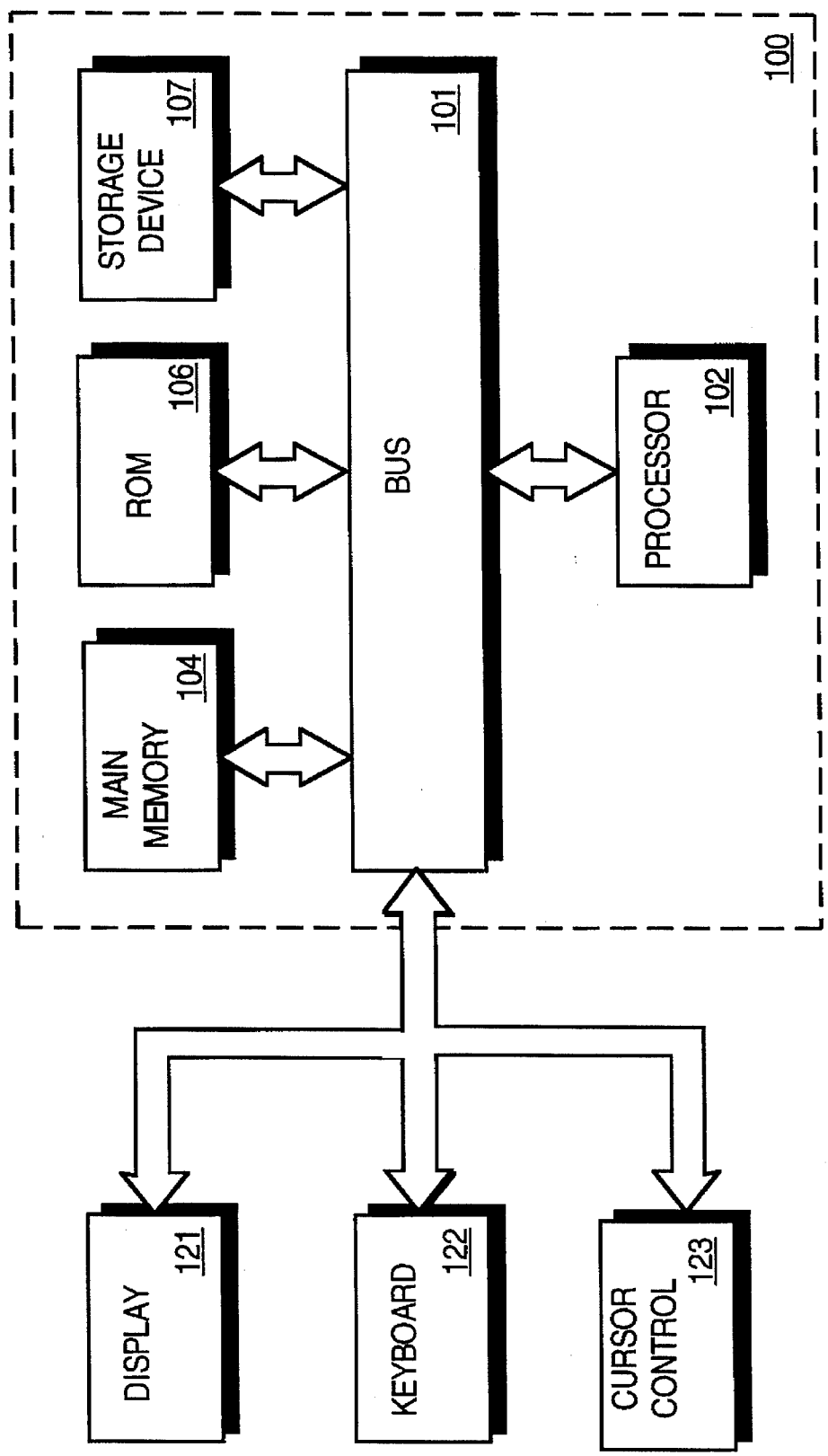
FIG. 1 illustrates a computer system upon which an embodiment of the invention may be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

In the currently preferred embodiment, the present invention is related to the use of computer system 100 for performing software testing operations. Processor 102 executes instructions stored in memory 104 which implement a test engine. Execution of the test engine instructions causes processor 102 to access data stored in a hierarchical test base data structure preferably located on storage device 107. Processor 102 modifies the system environment and tests software based on files stored within the test base structure, as shall be described hereafter.

THE TEST BASE STRUCTURE

Figure 2:
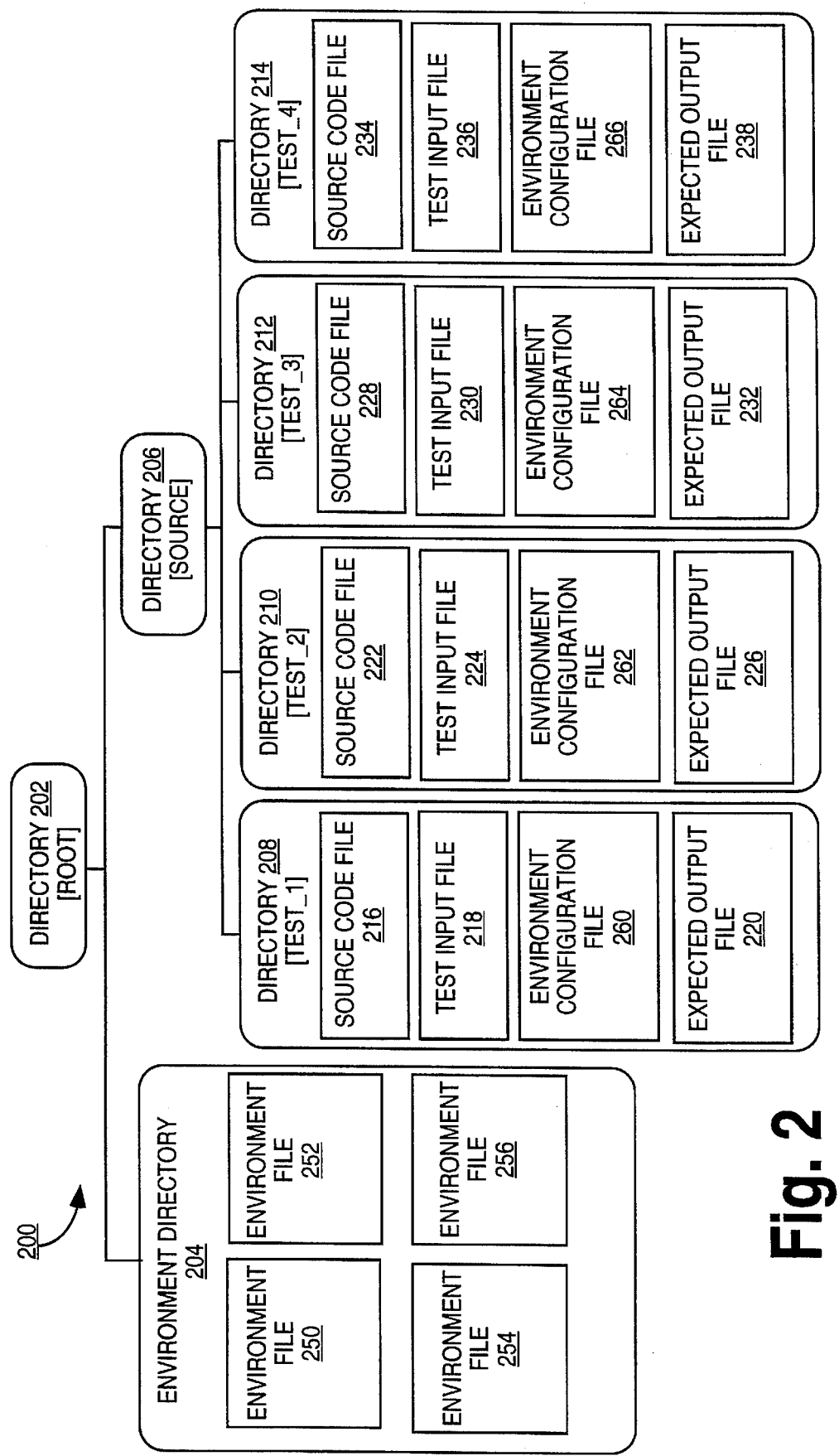
FIG. 2 is a block diagram illustrating a test base constructed according to an embodiment of the invention.

Referring to FIG. 2, it illustrates a test base 200 for storing the files required to perform a series of tests according to an embodiment of the present invention. Test base 200 is a hierarchical directory structure. That is, test base 200 includes levels or layers of connected directories. Within the hierarchical directory structure, a directory directly connected to and above a given directory is referred to as a parent of the given directory. A directory directly connected to and below a given directory is referred to as a child of the given directory. All directories connected to and above a given directory are referred to as ancestors of the given directory. All directories connected to and below a given directory are referred to as descendants of the given directory.

In the preferred embodiment, all files involved in the testing process are named according to strict naming conventions so that the type of information contained in each file may be determined based on the name of the file. For example, files containing source code written in the "C" programming language end in the extension ".c". Similarly, files containing the expected output of a block of a test end in the extension ".block.pass".

Test base 200 includes a root directory 202 that has a plurality of child directories 204 and 206. Each directory in the test base 200 directory structure, with the possible exception of root directory 202, has one parent directory. Typically, root directory 202 will be the child of a directory (not shown) that is not part of the test base 200. Each directory may store any number of files and have any number of child directories.

TEST FILES

The files stored within test base 200 include environment files, environment configuration files, source code files, test input files and expected output files. Environment files and environment configuration files specify values for environment variables. Source code files contain source code that defines software to be tested. Test input files contain data to be sent to a software program during testing. Expected output files contain data to be compared with the actual output of software after the software has been tested. While FIG. 2 shows directories with one of each of these types of files, the actual correlation between files, directories and tests may vary. For example, some tests may have more than one of some types of test files. Conversely, some tests may not require some of these types of files. In addition, a directory may hold the files for more than one test.

Files are stored at locations within the hierarchical directory structure of test base 200 according to the information that the files contain. Specifically, the environment files are stored in or below directory 204. Source code files, environment configuration files, test input files and expected output files are stored in or below directory 206.

In the illustrated example, a separate directory exists under source directory 206 for each test to be performed. The directory corresponding to a test is referred to herein as the "target directory" of the test. Target directories may be one or more levels below source directory 206 in the hierarchical tree structure. The source code, test input and expected output files for a particular test are stored in the target directory of the particular test. The target directory of a particular test may also have stored therein an environment configuration file that specifies parameters that apply to the test by establishing values for certain environment variables.

As mentioned above, multiple tests can share a single directory, so that many small tests can conserve system resources. In this situation the test consists of all files that match, by name, the name of the test. A match occurs if the name of the test is a prefix of the name of the file. Thus, a test xyz will consist of all files in directory xyz, if xyz is a directory. Otherwise, the test consists of all files beginning with xyz.

In the specific example shown, directory 206 includes four child directories 208, 210, 212 and 214. Each of directories 208, 210, 212 and 214 corresponds to a test. Specifically, directories 208, 210, 212 and 214 correspond to TEST_1, TEST_2, TEST_3 and TEST_4, respectively. The source code, test input file and expected output file involved in each test is stored in the target directory for that test. Specifically, directory 208, which corresponds to TEST_1, includes a source code file 216, a test input file 218 and an expected output file 220 for TEST_1. Directory 210, which corresponds to TEST_2, includes a source code file 222, a test input file 224 and an expected output file 226 for TEST_2. Directory 212, which corresponds to TEST_3, includes a source code file 228, a test input file 230 and an expected output file 232 for TEST_3. Directory 214, which corresponds to TEST_4, includes a source code file 234, a test input file 236 and an expected output file 238 for TEST_4.

Directory 204 includes four environment files 250, 252, 254 and 256. Directories 208, 210, 212 and 214 contain environment configuration files 260, 262, 264 and 268, respectively. As shall be explained hereafter, environment files and environment configuration files contain environment modifiers.

ENVIRONMENT MODIFIERS

Environment modifiers are instructions that specify values for environment variables. Thus, a typical environment modifier has two components, the first component identifies an environment variable and the second component identifies the value that is to be assigned to the environment variable. For example, the environment modifier E_VAR_1="VAL1" specifies that the environmental variable E_VAR_1 is to be assigned the value VAL1.

In general, the environment modifiers in environment files and environment configuration files establish values for environment variables that relate to some aspect of the testing process. In the preferred embodiment, the environment variable "TEST_SEQUENCE" is one such environment variable. The environmental variable TEST_SEQUENCE is used to store a list of steps that are to be performed during a particular test operation. For example, the environment modifier TEST_SEQUENCE="block1 block2" specifies a two step testing operation in which block1 is performed, then block2 is performed.

Environment modifiers may also establish values for environment variables that specify compile options for particular compilers. For example, to indicate that all "C" code compiled during a test should be compiled with the compile options "-x02" and "-1m", an environment file may include the environment modifier OPTIONS_C="-x02-1m". This environment modifier specifies that the environment variable OPTIONS_C should be set to the value "-x02-1m". Similarly, an environment file may contain an environment modifier which sets the environment variable "OPTIONS_F77" to a particular value to indicate that all FORTRAN-77 code compiled during a test should be compiled with particular compile options.

An implemented embodiment of the present invention supports environmental variables for a wide variety of test-related functions. Table 1 contains examples of environmental variables that are supported in an implemented embodiment of the present invention. Values for these environmental variables are assigned though the use of environment modifiers.

TABLE 1

| NAME OF ENVIRONMENT VARIABLE | FUNCTION OF ENVIRONMENT VARIABLE |
| --- | --- |
| OPTIONS_C | Holds a value that indicates options for C compile operations. |
| OPTIONS_CC | Holds a value that indicates options for C++ compile operations. |
| OPTIONS_F77 | Holds a value that indicates options for FORTRAN-77 compile operations. |
| OPTIONS_F90 | Holds a value that indicates options for FORTRAN-90 compile operations. |
| OPTIONS_PC | Holds a value that indicates options for Pascal compile operations. |
| OPTIONS_DEBUG | Holds a value that indicates options for debugger operations. |
| OPTIONS_OC | Holds a value that indicates additional options objective C compile. |
| OPTIONS_LD | Holds a value that indicates additional options to be added to the compile and final link stage of compilation. |
| PRODUCT_EXECUTE | Holds a value that indicates the name of a program to execute during a hydra-execute block. If it is not defined, the program "a.out" is executed. |
| RESULTS_CONFIG | Holds a value that indicates the correct machine architecture for a particular test. |
| STOP_ON_ERROR | Holds a value that indicates a limit to the number of test failures which can occur during a testing session. Set this variable to N. When N failures occur, the testing session terminates. |
| BEFORE_COMMAND | Holds a value that indicates a command to be executed before running any tests. Can only be used on a list of tests. |
| AFTER_COMMAND | Holds a value that indicates a command to be executed after running all of the tests. Can only be used on a list of tests. |
| HYDRA_TIMEOUT | Holds a value that indicates the maximum time in wallclock minutes for a test to run. Default is to let the test run for as long as it wants to. |
| HYDRA_LIMIT_CPU | Holds a value that indicates the maximum CPU time in seconds for each test to be executed. |
| HYDRA_LIMIT_CORE | Holds a value that indicates the maximum size the core file can be. |
| HYDRA_LIMIT_SIZE | Holds a value that indicates the maximum size of stacksize. |

THE TEST ENGINE

Figure 3:
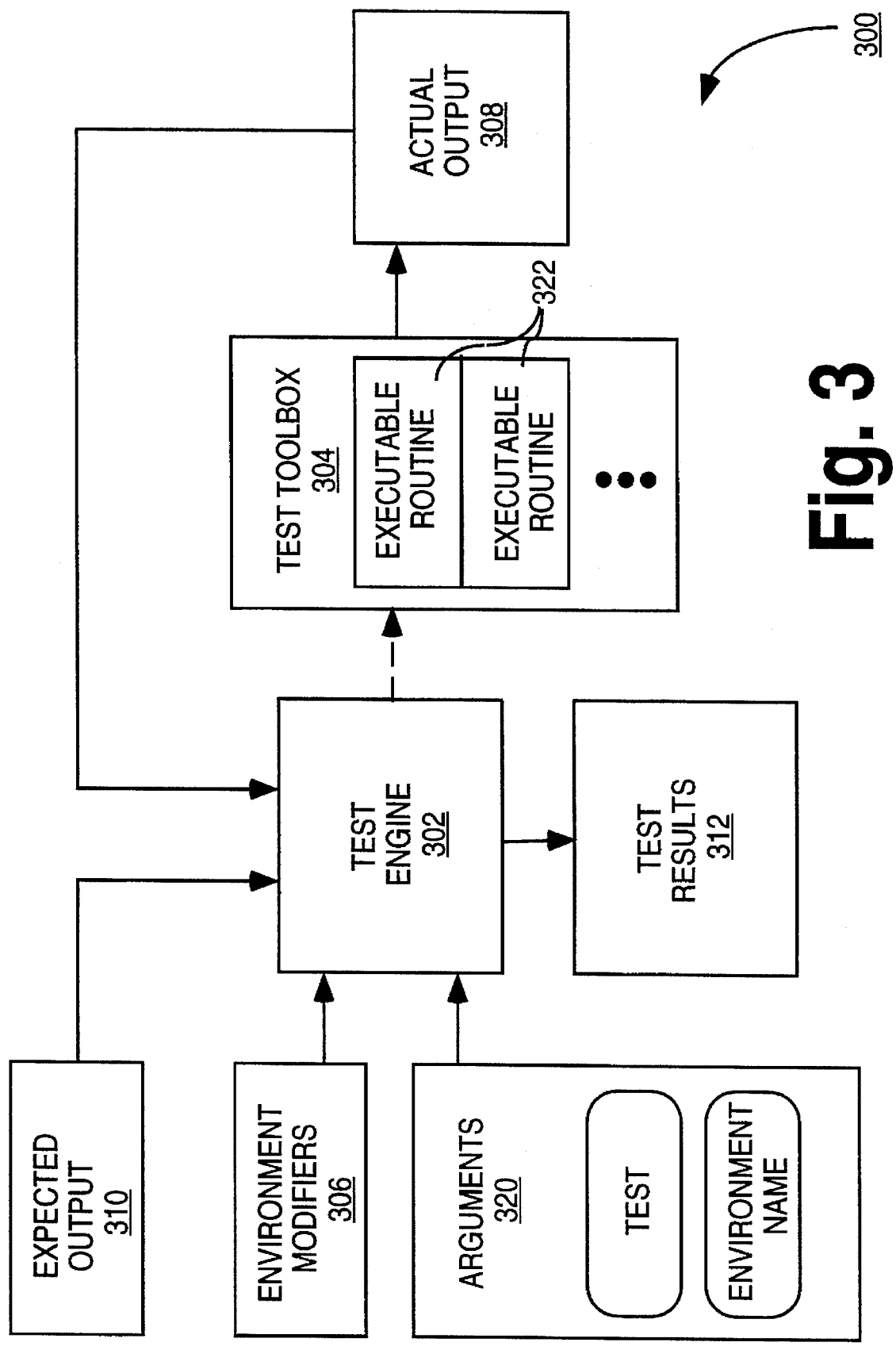
FIG. 3 is a block diagram illustrating a software testing system according to an embodiment of the invention.

Referring to FIG. 3, it is a block diagram of a software testing system 300 according to an embodiment of the invention. Software testing system 300 includes a test engine 302, a test toolbox 304, an actual output file 308, an expected output file 310, and a test results file 312.

In the preferred embodiment, test engine 302 is a software program executing on processor 102. Test toolbox 304 includes a plurality of executable routines 322. Routines 322 are invoked by test engine 302 based on arguments 320 sent to test engine 302 when test engine 302 is invoked and environment modifiers 306. Executable routines 322 execute on processor 102 when invoked by test engine 302. Execution of executable routines 322 causes actual output file 308 to be created. Expected output file 310 contains the output that should be generated in response to execution of one of executable routines 322. Test results file 312 contains data generated by test engine 302 based on a comparison of expected output file 310 to actual output file 308 or based on the exit status returned by the executable routine.

ESTABLISHING PARAMETERS FOR A TEST

Figure 4:
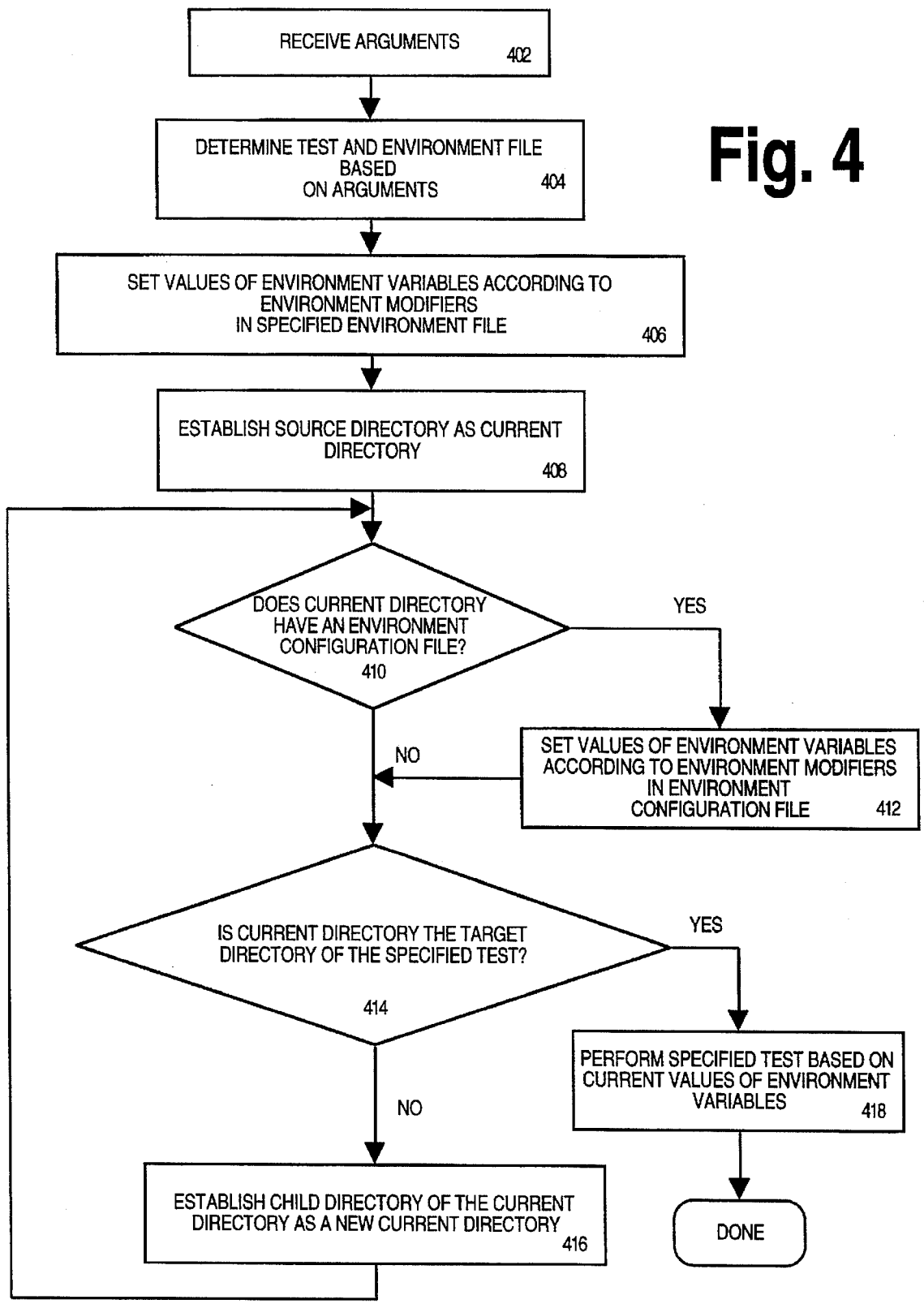
FIG. 4 is a flow chart illustrating steps for establishing the values of environment variables prior to performing a specified test.

Referring to FIG. 4, it illustrates a flow chart of the steps performed by testing system 300 to test a software program. When test engine 302 is invoked, it is passed two parameters. The first parameter indicates the test to be performed. The second parameter indicates the environment file that will be used for a particular test. In the preferred embodiment, these parameters are transmitted to the test engine 302 as command line arguments 320. Consequently, at step 402, test engine 302 receives arguments 320.

At step 404, test engine 302 determines, based on the arguments received at step 402, the particular test to be performed (the "target test") and the environment file that contains environment modifiers for the current testing operation (the "applicable environment file"). For example, the command line "TEST_ENGINE TEST_1 ENV252" invokes the test engine 302, identifies TEST_1 as the target test and identifies environment file 252 as the applicable environment file. Therefore, at step 402 test engine 302 would receive the arguments TEST_1 and ENV252 and at step 404 test engine 302 would determine that TEST_1 is the target test and that environment file 252 is the applicable environment file.

The applicable environment file contains a list of environment modifiers. At step 406, the environment is modified based on the environment modifiers contained in the applicable environment file. Specifically, the environment variables specified in the environment modifiers are set to the values specified in the environment modifiers. For example, assume that environment file 252 contains the environmental modifiers TEST_SEQUENCE="block1", E_VAR_1="OPT1", and E_VAR_2="OPT2". At step 406, the environmental variable TEST_SEQUENCE would be established and assigned the value "block1", environmental variable E_VAR_1 would be established and assigned the value "OPT1", and environmental variable E_VAR_2 would be established and assigned the value "OPT2".

In steps 408 through 416, test engine 302 traverses test base 200 from source directory 206 down to the target directory of the target test. Specifically, at step 408, source directory 206 is established as the "current directory". At step 410, test engine 302 determines if current directory contains an environment configuration file. If the current directory contains an environment configuration file, control passes to step 412, otherwise, control passes to step 414.

In the present example, source directory 206 does not contain any environment configuration file, therefore, control passes to step 414. At step 414, test engine 302 determines whether the current directory is the target directory. If the current directory is the target directory, control passes to step 418. Otherwise, control passes to step 416.

In the present example, the target test is TEST_1. Directory 208 corresponds to TEST_1 and is therefore the target directory. The current directory is source directory 206, not the target directory, so control passes to step 416.

At step 416, a child directory of the current directory is established as a new current directory. The child directory that is chosen as the new current directory is the child directory that is related to the target directory. A directory is related to a target directory if it is either an ancestor of the target directory or if it is the target directory. In the present example, directories 208, 210, 212 and 214 are all child directories of source directory 206. However, of those directories, only directory 208 is related to the target directory. Therefore, directory 208 is selected as the new current directory.

Upon completion of step 416, control passes back to step 410. At step 410, test engine 302 determines if the current directory contains an environment configuration file. If the current directory contains an environment configuration file, control passes to step 412, otherwise, control passes to step 414.

In the present example, directory 208 does contain an environment configuration file. Specifically, directory 208 contains environment configuration file 260. Therefore control passes to step 412. At step 412, the environment is modified based on the environment modifiers contained in the environment configuration file contained in the current directory. Specifically, the environment variables specified in the environment modifiers are set to the values specified in the environment modifiers.

In the preferred embodiment, assigning a new value to an environment variable that has already been assigned a value overrides the previously assigned value. For example, assume that environment configuration file 260 contains the environment modifiers TEST_SEQUENCE="block 1 block2", E_VAR_1="OPT3", and E_VAR_3="OPT4". At step 412, the value of the environmental variable TEST_SEQUENCE would be changed from "block1" to "block1 block2". The value of environmental variable E_VAR_1 would be changed from "OPT1" to "OPT3", and environmental variable E_VAR_3 would be established and assigned the value "OPT4". This example illustrates how environment configuration files can both override and supplement the environment modifications made by the applicable environment ride.

Upon completion of step 412, control proceeds to step 414. At step 414, test engine 302 determines whether the current directory is the target directory. If the current directory is the target directory, control passes to step 418. Otherwise, control passes to step 416.

In the present example, the target test is TEST_1. Directory 208 corresponds to TEST_1 and is therefore the target directory. At this point, directory 208 is also the current directory. Therefore control passes to step 418. At step 418, software testing system 300 performs the specified test based on the current values of environment variables. In the present example, this would involve performing block1 and block2 using the files of TEST_1 and the options OPT3 from E_VAR_1, OPT2 from E_VAR_2 and OPT4 from E_VAR_3. When step 418 has been completed, the single-test operation illustrated in FIG. 4 is done.

MULTIPLE-STAGE ENVIRONMENT SPECIFICATION

The process described above with reference to FIG. 4 allows the testing environment for any given test to be specified in successive stages. In the first stage, the testing environment is established based on a predefined or "packaged" environment specified in an environment file. In each successive stage, the environment is modified based on increasingly test-specific environment configuration files. Examples of establishing test environments in this manner shall now be given with reference to FIG. 5.

Figure 5:
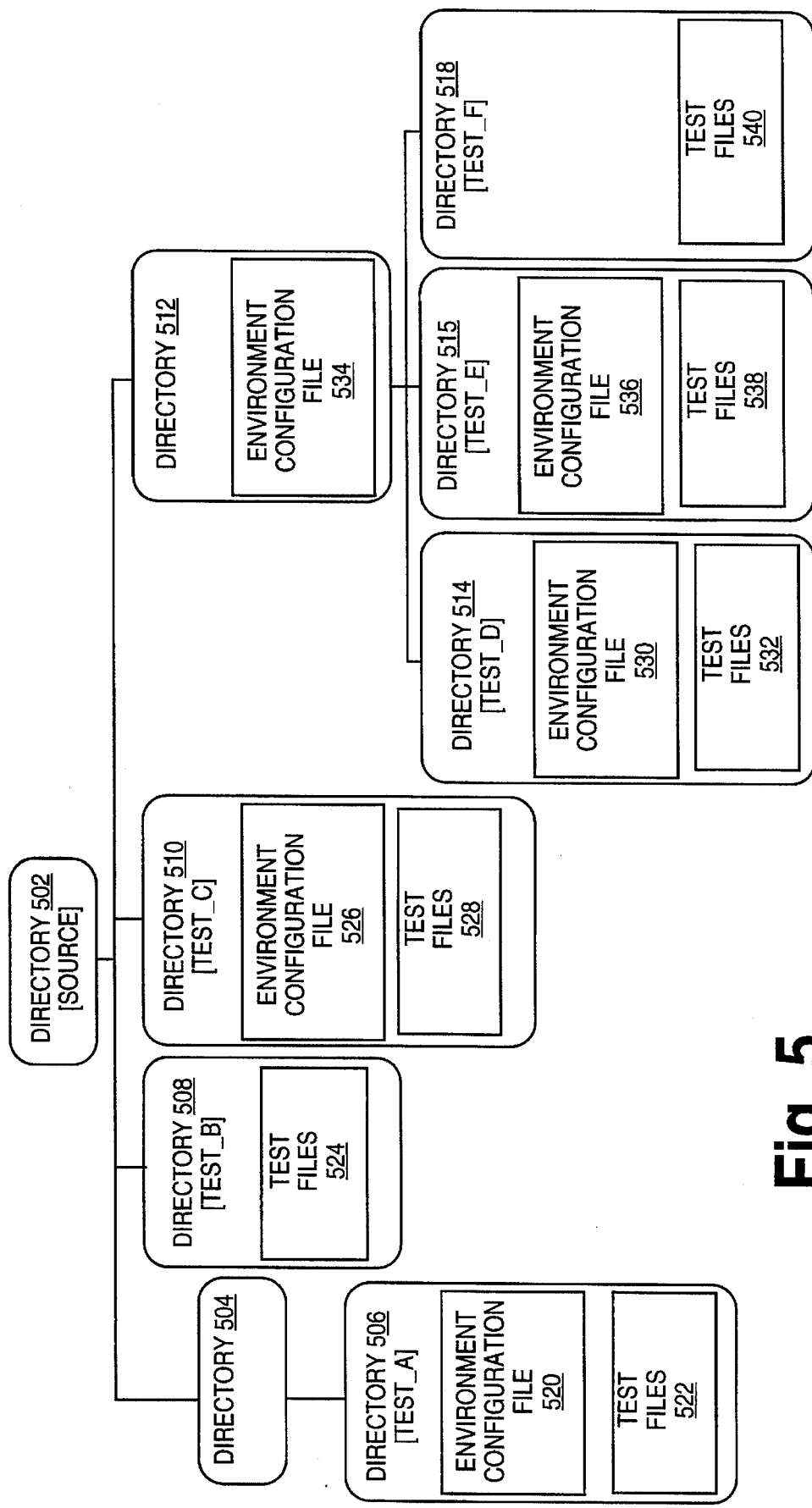
FIG. 5 is a block diagram illustrating a portion of an exemplary test base.

Referring to FIG. 5, it illustrates a portion of an exemplary test base. The illustrated tree structure stores files for six tests. Specifically, directories 506, 508, 510, 514, 516 and 518 store test files 522, 524, 528, 532, 538 and 540 for TEST_A, TEST_B, TEST_C, TEST_D TEST_E and TEST_F, respectively. The test files for any given test may include source code files, test input files and expected output files. The environment modification process that would be performed by test engine 302 prior to each of TEST_A, TEST_B, TEST_C, TEST_D TEST_E and TEST_F shall now be described.

Prior to testing the software associated with TEST_A, test engine 302 modifies the environment based on a specified environment file. Test engine 302 then checks source directory 502 to determine whether it contains an environment configuration file. After test engine 302 determines that source directory 502 does not have an environment configuration file, test engine 302 checks directory 504 for an environment configuration file. After test engine 302 determines that directory 504 does not have an environment configuration file, test engine 302 checks directory 506 for an environment configuration file. Finding an environment configuration file in directory 506, test engine 302 alters the environment based on the environment modifiers contained in environment configuration file 520. Having arrived at the target directory for TEST_A, the modification of the test environment for TEST_A is completed.

Prior to testing the software associated with TEST_B, test engine 302 modifies the environment based on a specified environment file. Test engine 302 then checks source directory 502 to determine whether it contains an environment configuration file. After test engine 302 determines that source directory 502 does not have an environment configuration file, test engine 302 checks directory 508 for an environment configuration file. No environment configuration file exists in directory 508. Having arrived at the target directory for TEST_B, the modification of the test environment for TEST_B is completed.

Prior to testing the software associated with TEST_C, test engine 302 modifies the environment based on a specified environment file. Test engine 302 then checks source directory 502 to determine whether it contains an environment configuration file. After test engine 302 determines that source directory 502 does not have an environment configuration file, test engine 302 checks directory 510 for an environment configuration file. Finding an environment configuration file in directory 510, test engine 302 alters the environment based on the environment modifiers contained in environment configuration file 526. Having arrived at the target directory for TEST_C, the modification of the test environment for TEST_C is completed.

Prior to testing the software associated with TEST_D, test engine 302 modifies the environment based on a specified environment file. Test engine 302 then checks source directory 502 to determine whether it contains an environment configuration file. After test engine 302 determines that source directory 502 does not have an environment configuration file, test engine 302 checks directory 512 for an environment configuration file. Finding an environment configuration file in directory 512, test engine 302 alters the environment based on the environment modifiers contained in environment configuration file 534. Test engine 302 then checks directory 514 for an environment configuration file. Finding an environment configuration file in directory 514, test engine 302 alters the environment based on the environment modifiers contained in environment configuration file 530. Having arrived at the target directory for TEST_D, the modification of the test environment for TEST_D is completed.

Prior to testing the software associated with TEST_E, test engine 302 modifies the environment based on a specified environment file. Test engine 302 then checks source directory 502 to determine whether it contains an environment configuration file. After test engine 302 determines that source directory 502 does not have an environment configuration file, test engine 302 checks directory 512 for an environment configuration file. Finding environment configuration file 534 in directory 512, test engine 302 alters the environment based on the environment modifiers contained in environment configuration file 534. Test engine 302 then checks directory 516 for an environment configuration file. Finding an environment configuration file 536 in directory 516, test engine 302 alters the environment based on the environment modifiers contained in environment configuration file 536. Having arrived at the target directory for TEST_E, the modification of the test environment for TEST_E is completed.

Prior to testing the software associated with TEST_F, test engine 302 modifies the environment based on a specified environment file. Test engine 302 then checks source directory 502 to determine whether it contains an environment configuration file. After test engine 302 determines that source directory 502 does not have an environment configuration file, test engine 302 checks directory 512 for an environment configuration file. Finding environment configuration file 534 in directory 512, test engine 302 alters the environment based on the environment modifiers contained in environment configuration file 534. Test engine 302 then checks directory 518 for an environment configuration file. No environment configuration exists in directory 518. Having arrived at the target directory for TEST_F, the modification of the test environment for TEST_F is completed.

The above examples illustrate how layers of environment configuration files may be used in conjunction with the specified environment files to establish a testing environment. In the case of TEST_B, the environment is not modified based on any environment configuration files. Therefore, the software associated with TEST_B will be tested in the environment defined in the specified environment file. In the cases of TEST_A and TEST_C, the environment established by the specified environment tie is altered based on a single environment configuration file located in the respective target directories of TEST_A and TEST_C. In the cases of TEST_D and TEST_E, the environment established by the specified environment file is altered twice, first based on the contents of environment configuration file 534, and then again based on the contents of environment configuration files 530 and 536. In the case of TEST_F, the environment established by the specified environment file is altered once based on environment configuration file 534, which is located in an ancestor directory of the target directory for TEST_F.

The multiple-stage environment modification process provided by the present invention yields many benefits to the tester. For example, some testing parameters may be required by more than one test. Rather than create identical environment configuration files for each test, a single environment configuration file that establishes the required parameter values may be placed in a directory that is an ancestor of target directories of all of the tests that require the parameter values. Such environment configuration files are referred to herein as common or stored environment configuration files. Environment configuration file 534 is an example of a common environment configuration file, since the test parameters defined in environment configuration file 534 are applied before performance of TEST_D, TEST_E and TEST_F.

Further, a common environment configuration file can be used with a set of tests even if some of the parameters defined in the common environment configuration file do not apply to some the tests. For example, environment configuration file 534 may contain the environment modifier ENV1="OPT1". However, TEST_D may require that the value of ENV1 be set to "OPT2", while TEST_E requires that the value of ENV1 be set to "OPT3". Assuming that environment configuration file 530 sets ENV1 to "OPT2" and environment configuration file 536 sets ENV1 to "OPT3", environment configuration file 534 may still be shared.

PERFORMING A TEST OPERATION

Figure 6:
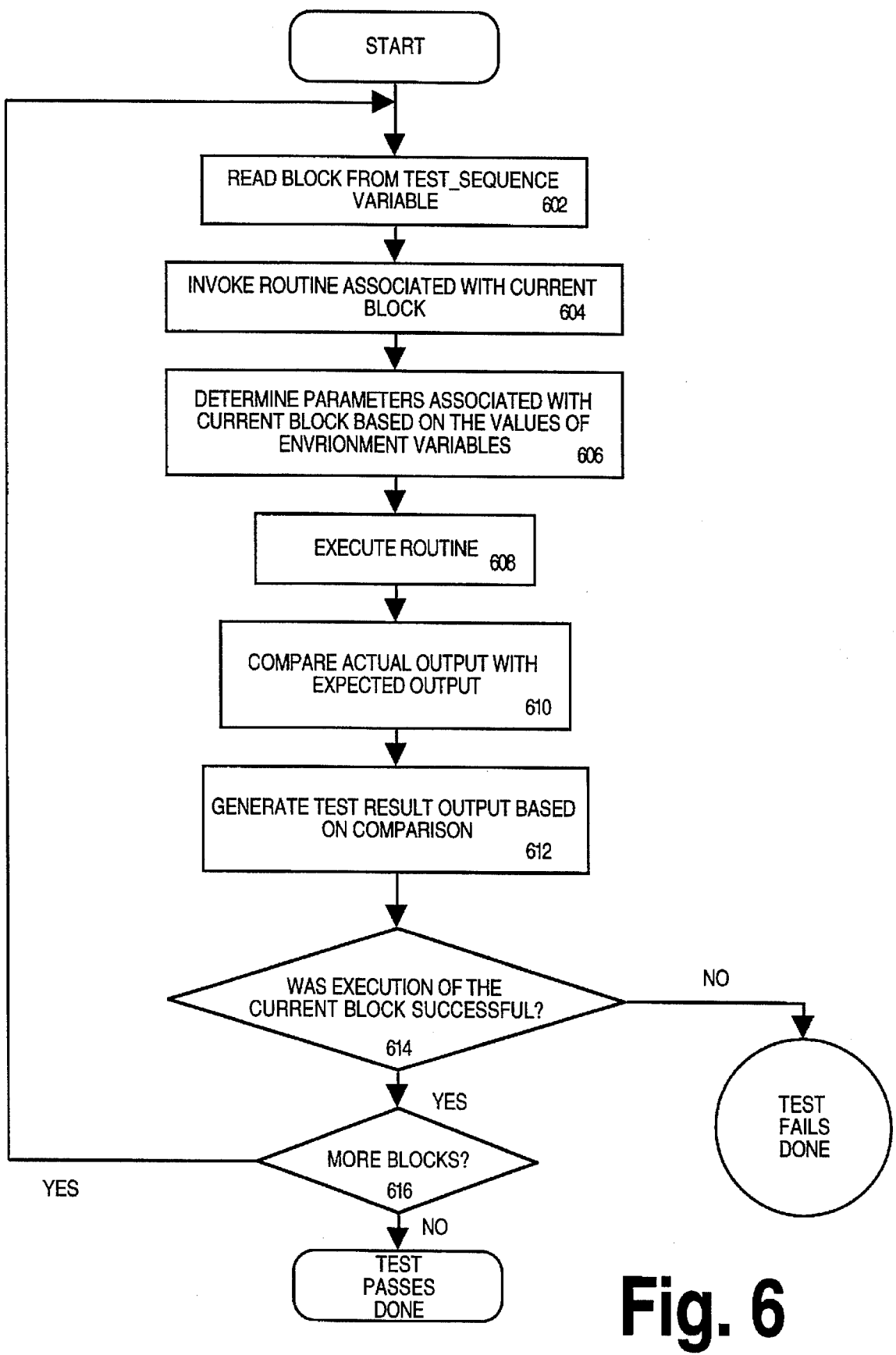
FIG. 6 is a flow chart illustrating the steps for performing a testing operation once the testing environment has been established.

Referring to FIG. 6, it is a flow chart of the steps performed by software testing system 300 once the values of environment variables for a given test have been established, as described above. Each testing operation involves the performance of one or more test steps or "blocks". As shall be explained hereafter, the specific blocks performed in a given test are determined by the value of TEST_SEQUENCE after the testing environment has been established for the test.

In the preferred embodiment, all of the files associated with the current test are copied into a directory outside of test base 200 prior to the execution of any blocks of the test. For example, source code file 216, test input file 218 and expected output file 220 are copied to a separate directory prior to the performance of TEST_1. After the files related to the test are copied, all actions are performed on the copies of the files rather than the originals. This practice allows the same test to be executed by two different users at the same time without causing file sharing conflicts.

At step 602, test engine 302 determines the first block of the current test. Test engine 302 determines the block by accessing the value of the TEST_SEQUENCE variable. If TEST_SEQUENCE specifies more than one block, then test engine 302 reads the blocks in sequence. In the present example, the TEST_SEQUENCE variable has the value "block1 block2". Test engine has not yet determined any test blocks. Therefore, test engine 302 initially establishes block1 as the current block.

At step 604, test engine 302 invokes the murine of executable routines 322 that corresponds to the current block (the "invoked routine"). In the present example, the current test block is a compilation block. Therefore, test engine 302 invokes a routine of executable routines 322 that causes the appropriate compilation to be performed. Examples of executable routines contained in test toolbox 304 of an implemented embodiment of the invention are listed in Table 2.

TABLE 2

| BLOCK NAME TO INVOKE ROUTINE | FUNCTION OF ROUTINE |
| --- | --- |
| hydra_f77 | Compile one or more FORTRAN sources for execution. |
| hydra_f77_neg | Negative compile block for FORTRAN sources. This block is used to verify that specific compilation messages have occurred. |
| hydra_c | Compile one or more c sources for execution. |
| hydra_c_neg | Negative compile block for c sources. This block is used to verify that specific compilation messages have occurred. |
| hydra_f77_c | Compile FORTRAN and c sources. This block compiles FORTRAN first, then c code, linking with the c compiler. |
| hydra_c_f77 | Compile c and FORTRAN sources. This |

TABLE 2-continued

| BLOCK NAME TO INVOKE ROUTINE | FUNCTION OF ROUTINE |
| --- | --- |
| | block compiles c code first and then FORTRAN code, linking with the FORTRAN compiler. |
| hydra_execute | Execute the binary file created from one of the above compile blocks. If a test input file ("testname.execute.in") exists, it is redirected as input into the executable. |
| hydra_resolve | This block is called by each of the above blocks to determine if the step was successful or a failure. If there is a testname.block.pass file, it is used to determine pass or fail, otherwise the status of the command executed is used to determine pass or fail. |
| hydra_debug | This block to run the executables through a debugger. |

At step 606, the invoked routine determines the test parameters it requires based on the present value of certain environment variables. The test parameters applicable to the test have been previously established by assigning values to special environment variables, as described above. Therefore, the invoked routine determines whether any test parameters apply to the current block (block1) by inspecting the values of environment variables. Assume, for example, that block1 corresponds to a routine that executes a compiler to compile "C" source code. E_VAR_1 may be the environment variable that stores the compilation options for "C" code. Consequently, the invoked routine determines that the compilation operation of block1 should be performed with the compilation option OPT3.

At step 608, the invoked routine executes. In the present example, the routine causes source code file 216 to be compiled with the compilation parameter OPT3. The output generated by the compilation operation could take many forms. In the simplest case, the output may simply be a status code. In other cases, the output could be an actual file. Actual output file 308 in FIG. 3 generally represents the output generated during the execution of the invoked routine.

At step 610, the actual output generated during the execution of the invoked routine is compared with the expected output. During this step, test engine 302 determines whether an expected output file corresponding to the current block exists. Typically, each block of a test generates output that is different from the output generated during other blocks of the test. Therefore, expected output files are block specific. In the preferred embodiment, the name of each expected output file indicates the block to which it corresponds. For example, the expected output file for the compilation block of TEST_1 may be named "TEST1.compile.pass".

In the present example, TEST_1 has one expected output file 220, but two blocks. It shall be assumed that expected output file 220 contains the output expected during block2. It shall also be assumed that block2 involves executing the program created during block1 with the input contained in test input file 224. Since, the current block (block1) of TEST_1 does not have an associated expected output file, test engine 302 simply determines whether the status value generated by the compilation operation indicates that the compilation operation was successful.

At step 612, test engine 302 generates result output based on the comparison of the expected output and the actual output. The result output may take many forms. For example, the result output may simply be a status value to indicate success or failure, or a detailed report that elaborates on the probable causes of any differences between the expected output and the actual output. In one implemented embodiment, a history file creation tool 802 (FIG. 8) categorizes the test results into five categories: (1) New Pass, (2) Old Pass, (3) New Failure, (4) Old Failure and (5) Old Failure, but New Results.

For each test operation, test engine 302 reports "pass", "fail" or "not applicable". For example, if the expected output matches the actual output, then test engine 302 reports "pass". If the expected output does not match the actual output, the test engine 302 reports "fail". If no expected output is provided, the test engine 302 reports "not applicable".

The history file creation tool 802 compares the result generated by the test engine 302 to results from a previous run of the same test. The previous test results include whether the test passed on the previous run, and if not, an indication of why the test did not pass. In the preferred embodiment, history file creation tool 802 acquires this information from a test result history file. Test result history files will be discussed in greater detail hereafter.

If the test passed the current run and passed the previous run, then the test is categorized as an Old Pass. If the test passed the current run but failed the previous run, then the test is categorized as a New Pass. If the test failed the current run but passed the previous run, then the test is categorized as a New Failure. If the test failed the previous run for the same reason that it failed the current run, then the test is categorized as an Old Failure. If the test failed the previous run for a different mason than the reason it failed the current run, then the test is categorized as an Old Failure with a New Result. By categorizing tests in this manner, less human effort is required to identify important results in the result history files generated by history file creation tool 802, since old failures and passes are generally less important than new results.

In the present example, the expected output is simply an indication that the compilation step was performed successfully. Therefore, the output generated at step 612 may simply be a status value.

At step 614, test engine 302 determines whether the test block was successfully performed. If the current block was not successful, then the testing process stops and reports a failure for this test. Otherwise, control passes to step 616. Typically, this determination hinges on the results of the comparison performed at step 610. In the present example, it shall be assumed that the compilation of source code file 216 was successful. Therefore, control will pass to step 616.

At step 616, test engine 302 determines whether all the blocks specified in TEST_SEQUENCE have been processed. In the present example, only block1 has been processed. Therefore, control passes back to step 602.

At step 602, test engine 302 determines the next block of the current test. Test engine has already processed block1. Therefore, test engine 302 establishes block2 as the current block.

At step 604, test engine 302 invokes the routine of executable routines 322 that corresponds to the current block (block2). In the present example, the current block is a block the causes the software compiled during block1 to execute. Therefore, test engine 302 invokes a routine of executable routines 322 that causes the newly compiled software program to be executed.

At step 606, the invoked routine determines the test parameters it requires based on the present value of certain environment variables. Assume, for example, that E_VAR_2 and E_VAR_3 are environment variables associated with execution parameters for the software being tested. Consequently, the invoked routine determines that the software should be invoked with the execution options OPT2 and OPT4.

At step 608, the appropriate executable routine executes and generates output. In the present example, the routine causes the program generated from source code file 216 to execute, read test input file 218, and generate output based on the contents of test input file 218.

At step 610, the actual output generated during the current test block is compared with the expected output. During this step, test engine 302 determines whether an expected output file corresponding to the current block exists. In the present example, it is assumed that expected output file 220 is the output expected during block2. Since block2 is the current block, test engine 302 compares the output generated during the execution of the program with the contents of expected output file 220.

At step 612, test engine 302 generates output based on the comparison of the expected output and the actual output. In the preferred embodiment, the output includes data identifying any differences between the expected output and the actual output, in addition to data indicating whether the test block was successful.

At step 614, test engine 302 determines whether the test block was successfully performed. If the current block was not successful, then the testing process stops and reports a failure for this test. Otherwise, control passes to step 616. In the present example, it shall be assumed that the tested program performed in the expected manner. Therefore, control will pass to step 616.

At step 616, test engine 302 determines whether all the blocks specified in TEST_SEQUENCE have been processed. In the present example, all of the blocks have been processed. Therefore the testing process is done and the test has passed.

AUTOMATING MULTIPLE TESTS

The processes illustrated in FIGS. 4 and 6 relate to establishing an environment for a single test and performing a single test, respectively. However, according to one embodiment of the present invention, software testing system 300 supports the automatic performance of multiple tests.

To perform a single test, test engine 302 is sent the name of the test and the name of an environment file, as described above. To cause software testing system 300 to automatically perform multiple tests, test engine 302 is sent a list of test name/environment file name pairs (a "test list"). In one embodiment, test engine 302 is made aware of such a list by including in arguments 320 the name of a file that contains the test list.

Figure 7:
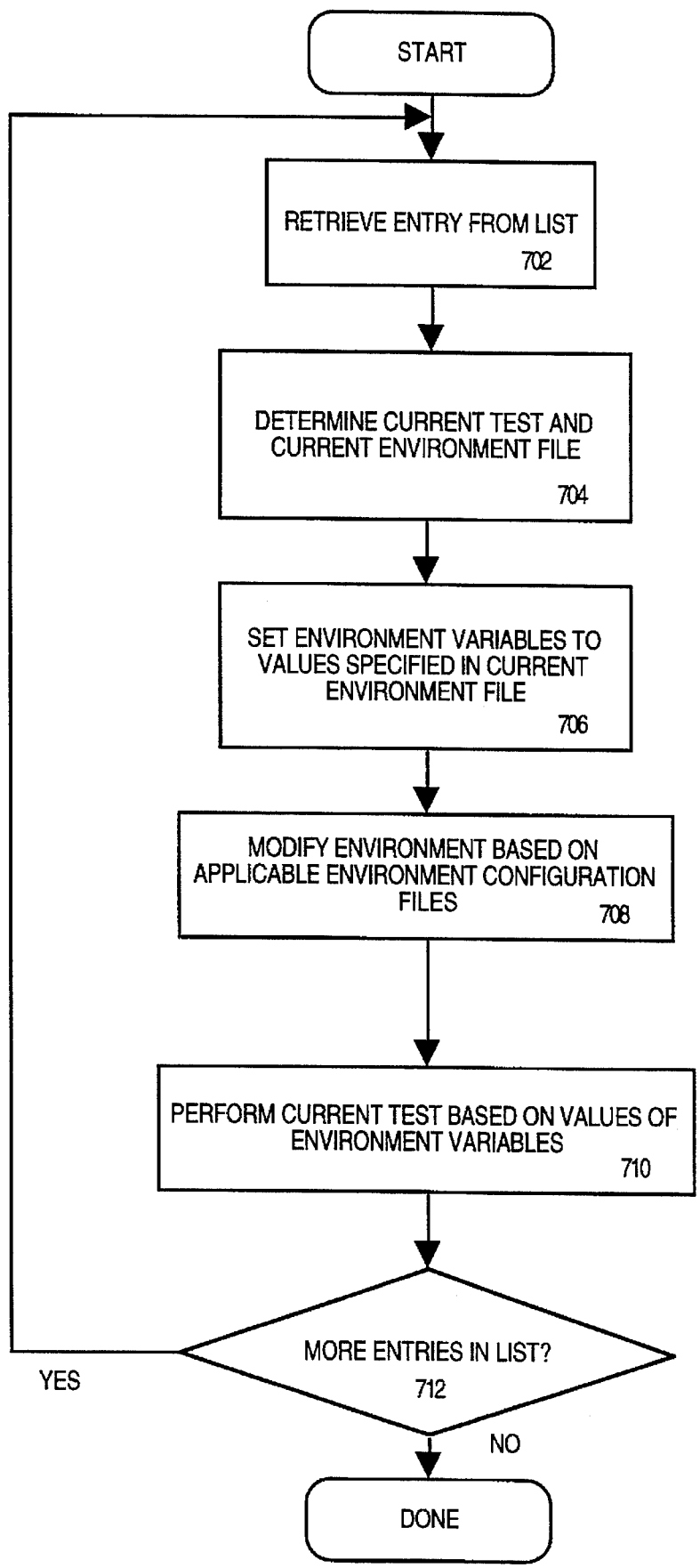
FIG. 7 is a flow chart illustrating the steps for processing a list of tests.

FIG. 7 is a flow chart illustrating the steps performed by software testing system 300 when test engine 302 is passed the name of a file containing a test list. For example, assume a file named TEST_LIST contains the entries (TEST_1, ENV_1), (TEST_2, ENV_1), and (TEST_2, ENV_2). Assume also that, when the test engine 302 was invoked, the filename TEST_LIST was passed to test the engine 302 through arguments 320.

At step 702, test engine 302 retrieves the first entry (TEST_1, ENV_1) from the list. At step 704, test engine 302 determines the current test and the current environment file based on the current entry. In the present example, the current entry is (TEST_1, ENV_1), so test engine 302 determines that the current test is TEST_1, and the current environment file is ENV_1.

At step 706, test engine 302 assigns values to environment variables according to the environment modifiers in the current environment file, ENV_1. At step 708, test engine 302 further modifies the environment based on applicable environment configuration files. As explained above with reference to FIG. 4, test engine 302 traverses a portion of the applicable test base from a predetermined directory (e.g. the SOURCE directory) to the target directory of the current test. Test engine 302 modifies the environment based on the modifiers contained in any environment configuration files encountered during that traversal.

At step 710, the current test is performed based on the current values of environment variables. The steps involved in executing a test are described above with reference to FIG. 6.

At step 712, test engine 302 determines whether the current list contains any more entries. In the present example, the current list contains three entries, (TEST_1, ENV_1), (TEST_2, ENV_1), and (TEST_2, ENV_2), of which only the first entry has been processed. Therefore, control passes back up to step 702.

At step 702, test engine 302 retrieves the next entry CYEST_2, ENV_1) from the list. At step 704, test engine 302 determines the current test and the current environment file based on the current entry. In the present example, the current entry is (TEST_2, ENV_1), so test engine 302 determines that the current test is TEST_2, and the current environment file is ENV_1.

At step 706, test engine 302 assigns values to environment variables according to the environment modifiers in the current environment file, ENV_1. At step 708, test engine 302 further modifies the environment based on applicable environment configuration files. At step 710, the current test, TEST_2, is performed based on the current values of environment variables.

At step 712, test engine 302 determines whether the current list contains any more entries. In the present example, the entry CYEST_2, ENV_2) has not yet been processed. Therefore, control passes back up to step 702.

Steps 702 through 712 are repeated for the entry (TEST_2, ENV_2) by the same process described above with respect to the preceding entries. After the entry (TEST_2, ENV_2) has been processed, test engine 302 determines, at step 712 that all of the entries have been processed. The automated testing process is therefore completed.

TEST RESULT HISTORY FILE

As explained above, test engine 302 generates output based on the results of each test that software testing system 300 performs. Preferably, as a minimum, the test output generated by test engine 302 indicates whether a test passed or failed. In the preferred embodiment, test engine 302 generates output indicating the name of the test, the name of the environment used in the test, whether the test was successful, the computer system on which the test was run, how long it took to run the test, the date and time the test was run and, if the test failed, a one line description of why the test failed.

Figure 8:
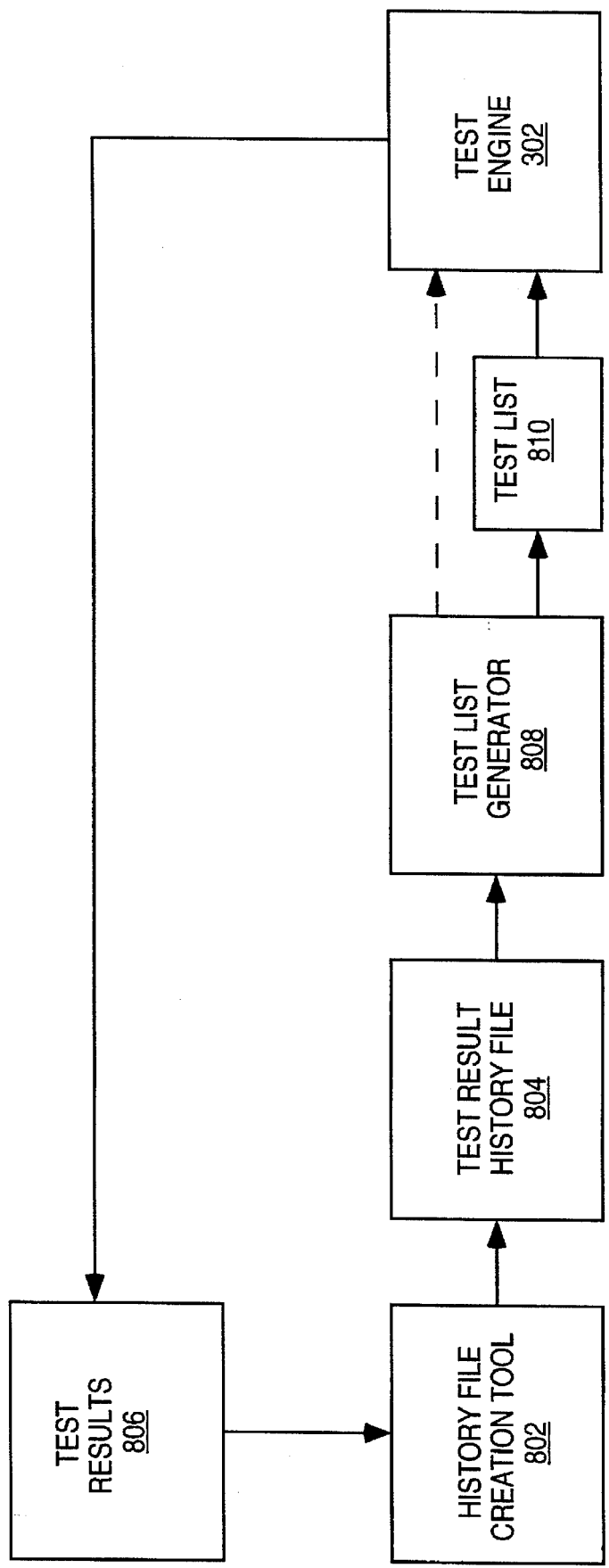
FIG. 8 is a block diagram illustrating a history file creation tool and a test list generator according to an embodiment of the invention.

In addition to individual test results, one embodiment of software testing system 300 includes a tool for generating a file that contains a history of test results. Referring to FIG. 8, it is a block diagram illustrating a history file creation tool 802 for creating and updating a test result history file 804. History file creation tool 802 reads the test results 806 generated by test engine 302 responsive to a test and updates test result history file 804 to reflect the information contained in test results 806.

Specifically, if test result history file 804 does not already contain an entry for the test/environment combination identified in the test results 806, then history file creation tool 802 adds a new entry to test result history file 804 for the test/environment combination. The entry preferably includes the name of the test, the name of the environment used in the test, whether the test was successful, the computer system on which the test was ran, how long it took to run the test, the date and time the test was run and, if the test failed, a one line description of why the test failed. The entry in test result history file 804 may also contain cumulative information, such as how many total times the particular test/environment combination tested successfully, how many total times it failed and how many times it consecutively passed or failed.

If test result history file 804 already contains an entry for the test/environment combination identified in the test results 806, then history file creation tool 802 updates the existing entry to reflect the new information contained in test results 806. In one embodiment, history file creation tool 802 replaces the information about the previous test with the new information, and updates the cumulative values. Alternatively, history file creation tool 802 may append the new information to the existing entry and update the cumulative values. Appending the new information to the entry has the advantage of maintaining a complete record of past test results. However, appending the new information has the disadvantage that it causes the size of test result history file 804 to constantly increase.

In the preferred embodiment, history file creation tool 802 maintains separate test result history files for each test data base. Test result history file 804 may include, for example, histories of TEST_1, TEST_2, TEST_3 and TEST_4 run against different environments from test base 200. In alternate embodiments, history file creation tool 802 may differentiate between test history files based other criteria. For example, history file creation tool 802 may create a separate test result history file for tests that result in particular types of failures.

AUTOMATED TEST LIST GENERATION

According to one embodiment of the invention, software testing system 300 further includes a test list generator 808. Test list generator 808 accesses the test history file 804 to determine which tests have been previously run, and what the outcome of each of the tests has been. Based on this information, test list generator 808 constructs a test list 810 and invokes test engine 302 to cause test engine 302 to perform the tests in the test list 810. As described above, a test list is an ordered set of test/environment combinations.

Test list generator 808 determines which tests to include in test list 810 and the order in which to place the tests in the list based on information stored in test result history file 804. In one embodiment, test engine 302 creates test list 810 by sorting all previously performed tests based on how recently their last failure occurred. For example, tests that failed the last time that they were run would be placed at the start of the test list. Tests that just recently began passing are next in the test list. Finally, tests have been passing for a long time are placed at the end of the test list.

While the amount and proximity of past failures may be one factor for selecting and ordering the tests in test list 810, test list generator 808 may take other factors into account as well. For example, test list generator 808 may construct test list 810 with only those tests that resulted in a particular type of error. Alternatively, test list generator 808 may construct test list 810 to include all tests run on a particular day, or on a particular computer architecture.

When test engine 302 is invoked and passed test list 810, test engine 302 processes the test list 810 as has been described above with reference to FIG. 7. During the processing of test list 810, tests will be performed and test engine 302 will generate output (e.g. test results 806) that reflects the results of the tests. The entire automated test process may then be repeated taking into account the new test results. Specifically, history file creation tool 802 may update test result history file 804 based on the new test results 806. Test list generator 808 may then generate a new test list 810 based on the updated test result history file 804 and invoke test engine 302 with the new test list 810. This automated cycle of testing may be repeated indefinitely.

ATTRIBUTE-BASED TEST LIST GENERATION

According to another aspect of the invention, test list generator 808 constructs test lists based on specified test attributes. Attributes may be assigned to a test by placing a test attribute file in the directory that corresponds to the test.

In the preferred embodiment, test attribute files are text files in which each entry specifies a test name followed by a list of attributes for the test indicated by the test name. For example, assume that a particular directory TEST_DIR is the target directory for two tests: TEST_1 and TEST_2. The test attribute file in that directory could contain the following two entries:

TEST_1: attribute_1, attribute_2, attribute_3
TEST_2: attribute_2, attribute_4, attribute_5.

If test list generator 808 is passed "TEST_DIR" and "attribute_1", test list generator 808 generates a test list containing only TEST_1, since TEST_1 is the only test in the specified directory that is associated with the specified attribute. Similarly, if test list generator 808 is passed "TEST_DIR" and "attribute_4", test list generator 808 will generate a test list that contains only TEST_2. However, if test list generator 808 is passed "TEST_DIR" and "attribute_2", it will generate a test list that specifies both TEST_1 and TEST_2, since both TEST_1 and TEST_2 are associated with the attribute_2.

In the preferred embodiment, each directory that is associated with a test contains a test attribute file with an entry that specifies the attributes for that test. In addition, test attribute files that are located in a directory that is a parent to a test directory will contain pointers to the test attribute files located in the test directories below it.

For example, consider a directory DIR1 that is a parent directory to directories DIR2 and DIR3. Assume that DIR1 is the test directory for a TEST_1 and a TEST_2, that DIR2 is a test directory for TEST_3 and TEST_4, and that DIR3 is a test directory for a TEST_5, TEST_6 and TEST_7. Assume also that a test attribute file in DIR1 contains the following entries @DIR2
@DIR3
TEST_1: attribute_1, attribute_2
TEST_2: attribute_1, attribute_3

Assume also that a test attribute file in DIR2 contains the following entries:

TEST_3: attribute_4, attribute_5
TEST_4: attribute_1, attribute_4

Finally, assume that a test attribute file in DIR3 contains the following entries:

TEST_5: attribute_1, attribute_5
TEST_6:attribute_3
TEST_7: attribute_6, attribute_7

The entries "@DIR2" and "@DIR3" in the test attribute file in DIR1 serve as pointers to the child directories of DIR1 that correspond to tests.

Using the above example, if test list generator 808 is past the values "DIR2" and "attribute_4", the test list generator 808 would generate a test list that specifies both TEST_3 and TEST_4, since both TEST_3 and TEST_4 are associated with attribute_4. Similarly, if test list generator 808 is past the values "DIR3" and "attribute_3", test list generator 808 will generate a test list that specifies TEST_6. If test list generator 808 is past "DIR1" and "attribute_1", the test list generator 808 will generate a list that includes TEST_1 and TEST_2. However, in addition to TEST_1 and TEST_2, test list generator 808 will follow the pointers contained in the test attribute file of DIR1 to determine whether any test located in child directories of DIR1 are associated with the specified attribute. In the present example, test list generator 808 would follow the link to DIR2 to determine whether TEST_3 or TEST_4 is associated with attribute_1, and then follow the link to DIR3 to determine whether TEST_5, TEST_6 or TEST_7 is associated with attribute_1. Thus, test attribute files effectively incorporate by reference all of the test attribute files that are located below them in the test directory structure.

Continuing with the above example, if test list generator 808 is passed "DIR1" and "attribute_1", it would generate a list that includes TEST_1 of DIR 1, TEST_2 of DIR1, TEST_4 of DIR2, and TEST_5 of DIR3. If test list generator 808 is passed "DIR1" and "attribute_2", then test list generator 808 would generate a list that includes TEST_1 of DIR1.

DISTRIBUTED TESTING

The tests performed by testing system 300 are not interdependent. That is, an operation in which TEST_1 is tested in environment ENV_1 will not affect a subsequent or simultaneous operation in which TEST_2 is tested in environment ENV_2. This holds true even when the same test is involved in two simultaneous test operations.

Because simultaneous performance of multiple tests will not affect the outcome of the tests, one test in a test list can be initiated without waiting for the previous tests to be completed. In the preferred embodiment, test engine 302 is able to distribute each test as a separate test process. Consequently, if a test list contains two tests and two processors are available, test engine 302 may assign one test process to each of the processors. The processors perform the test processes simultaneously. As a result, both tests may be completed in approximately half the time it would take to perform the two tests sequentially on one processor.

Because test engine 302 may distribute each test operation as a separate task process, multiple tests may be performed simultaneously on a single processor, multiple tests may be distributed among multiple processors in a single computer system, and/or multiple tests may be distributed among multiple computer systems (e.g. over a network). Consequently, a greater percentage of available computational power may be tapped to perform testing, resulting in shorter multiple-test performance times. In one embodiment, a specific environment variable is assigned a value indicating which processors or machines may be used to perform a particular series of tests. Test engine 302 then distributes the test processes among the processors or machines that are identified in the environment variable.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. An apparatus for performing a test on software in a computer system, wherein said computer system has an initial environment, the apparatus comprising:
   a storage device containing a test base, wherein the test base includes a
      plurality of directories connected to form a hierarchical directory structure, the plurality of directories including a test directory corresponding to said test;
   a processor coupled to said storage device;
   a test engine executing on said processor; and
   a plurality of environment configuration files stored in said plurality of directories.

2. The apparatus of claim 1 wherein said test engine determines which environment configuration files of said plurality of environment configuration files are applicable environment configuration files, wherein applicable environment configuration files are environment configuration files that apply to said test.

3. The apparatus of claim 2 wherein said test engine determines said applicable environment configuration files based on where said plurality of environment configuration files are stored in said plurality of directories relative to said test directory.

4. The apparatus of claim 2 wherein said test engine modifies said initial environment to create a modified environment based on said applicable environment configuration files.

5. The apparatus of claim 4 wherein said test engine causes said software to be tested in said modified environment.

6. The apparatus of claim 4 wherein: said software is defined in source code; and said source code is located in said test directory.

7. The apparatus of claim 6 wherein:
   said applicable environment configuration files specify compile options for compiling said source code; and
   said test engine causes said source code to be compiled according to said compile options prior to causing said software to be tested.

8. The apparatus of claim 4 wherein said test engine modifies said initial environment based on an environment file prior to modifying said initial environment based on said applicable environment configuration files.

9. The apparatus of claim 2 wherein said test engine determines any environment configuration files located in said test directory and in directories of said plurality of directories that are ancestors of said test directory to be said applicable environment configuration files.

10. The apparatus of claim 2 wherein:
    said applicable environment configuration files include a first environment configuration file located in a first directory of said plurality of directories and a second environment configuration file located in a second directory of said plurality of directories;
    said first environment configuration file specifies a first value for an environment variable;
    said second environment configuration file specifies a second value for said environment variable;
    said test engine causes said environment variable to be set to said first value if said first directory is a descendent of said second directory; and
    said test engine causes said environment variable to be set to said second value if said second directory is a descendent of said first directory.

11. A method for performing a test on software in a specified environment in a computer system, the computer system including a storage device containing a test base, the test base including a plurality of directories connected to form a hierarchical directory structure, wherein a first directory of said plurality of directories corresponds to said test, wherein a plurality of environment configuration files are stored in said plurality of directories, the method comprising the steps of:
    determining which of said plurality of environment configuration files are applicable environment configuration files based on where said plurality of environment configuration files are located in said hierarchical directory structure relative to said first directory;
    creating said specified environment based on said applicable environment configuration files; and
    testing said software in said specified environment.

12. The method of claim 11 wherein:
    source code defining said software is stored in said first directory;
    said applicable environment configuration files specify compile parameters for compiling said source code; and
    said step of testing said software includes compiling said source code according to said compile parameters.

13. The method of claim 11 further comprising the step of modifying an initial environment of said computer system according to a specified environment file prior to performing said step of creating said specified environment based on said applicable environment configuration files.

14. The method of claim 11 wherein said plurality of directories includes a second directory corresponding to a second test, wherein said second directory is neither an ancestor of nor a descendent of said first directory, wherein the method further comprises performing the following steps prior to performing said steps of determining, creating and testing:
    storing said applicable environment configuration files that apply to both said test and said second test in one or more common ancestor directories, wherein said one or more common ancestor directories are directories of said plurality of directories that are ancestors of both said first directory and said second directory; and
    storing said applicable environment configuration files that apply to said test but not to said second test in either said first directory or in an ancestor of said first directory that is not an ancestor of said second directory.

15. The method of claim 14 further comprising the steps of:
    storing source code defining said software in said first directory;
    storing source code defining a second software for said second test in said second directory.

16. The method of claim 14 further comprising the step of storing an environment configuration file that applies to said second test but not said first test in either said second directory or in an ancestor of said second directory that is not an ancestor of said first directory.

17. A method for performing a test on software using a test base on a computer-readable storage device, the method comprising the computer-implemented steps of:

creating a plurality of directories on said computer-readable storage device, wherein said plurality of directories are connected to form a hierarchical directory structure, wherein a first directory of said plurality of directories corresponds to a first test and a second directory of said plurality of directories corresponds to a second test;

storing a plurality of environment configuration files in said plurality of directories, wherein said environment configuration files include a first set of environment configuration files that apply to said first test but not said second test, a second set of environment configuration files that apply to said second test but not said first test, and a third set of environment configuration files that apply to both said first test and said second test; and performing a test on software using said plurality of directories and said plurality of environment configuration files, said performing step further including a step of determining which of said plurality of environment configuration files are applicable to said test based on a location of said environment configuration files in said plurality of directories.

18. The method of claim 17 wherein said step of storing said plurality of environment configuration files includes the steps of:

storing the environment configuration files of said first set of environment configuration files in either said first directory or in directories of said plurality of directories that are ancestors of said first directory but not ancestors of said second directory;

storing the environment configuration files of said second set of environment configuration files in either said second directory or in directories of said plurality of directories that are ancestors of said second directory but not ancestors of said first directory; and storing the environment configuration files of said third set of environment configuration files in directories of said plurality of directories that are ancestors of both said first directory and said second directory.

19. The method of claim 18 wherein said first test includes testing a first software program, wherein said second test includes testing a second software program, the method further comprising the steps of:

storing source code defining said first software program in said first directory; and storing source code defining said second software program in said second directory.

20. The method of claim 19 further comprising the steps of:

storing in said first directory a file containing input to be sent to said first software program during said first test;

storing in said first directory a file containing expected output to be generated by said first software program during said first test;

storing in said second directory a file containing input to be sent to said second software program during said second test; and storing in said second directory a file containing expected output to be generated by said second software program during said second test.

21. The method of claim 18 further comprising the step of storing environment files in said plurality of directories, wherein said environment files are stored in one or more directories that are neither ancestors nor descendants of said first directory or said second directory.

22. A method for performing a second series of tests on a plurality of software programs based on results of a first series of tests performed on said plurality of software programs, the method comprising the computer implemented steps of:

performing said first series of tests, wherein each test of said first series of tests is performed on a specified software/environment combination, wherein each software/environment combination includes a specified software program of said plurality of software programs and a specified environment of a plurality of predefined environments;

storing on a storage device result data indicating results of said first series of tests, said result data including data indicating whether a most recent performance of each test of said first series of tests was successful;

reading said result data from said storage device;

generating a test list based on said result data, wherein said test list includes an ordered list of entries, wherein each entry of said test list represents a test performed in said first series of tests, wherein each entry in said list of entries is ordered based on the outcome of the test represented by said entry during said first series of tests; and performing said second series of tests based on said test list, wherein the tests represented in said test list are performed in the order of their corresponding entries in the test list.

23. The method of claim 22 further comprising the step of updating said result data to reflect results of said second series of tests.

24. The method of claim 22 wherein said step of storing on said storage device result data includes the step of, for each test of said first series of tests, storing data indicating how many consecutive performances of said test were successful if said most recent performance of said test was successful.

25. The method of claim 24 wherein said step of performing said second series of tests includes performing the step of:

for each entry in said list of entries
assigning values to a plurality of environment variables according to the specified environment corresponding to said entry; and
executing routines corresponding to one or more test blocks identified in a particular environment variable of said plurality of environment variables.

26. The method of claim 22 wherein said step of generating said test list includes the step of placing entries for a first set of tests before entries for a second set of tests, wherein said first set of tests are tests whose most recent performance was not successful, wherein said second set of tests are tests whose most recent performance was successful.

27. The method of claim 22 wherein said step of performing said second series of tests includes spawning a plurality of test processes.

28. The method of claim 27 wherein said step of performing said second series of tests includes distributing said plurality of test processes to a plurality of processors.

29. The method of claim 28 wherein said step of distributing said plurality of test processes to said plurality of processors includes distributing said plurality of test processes to processors identified in a particular environment variable.

30. A method for selecting a subset of tests to run on software programs, wherein said subset of tests are a subset of a plurality of tests, the method comprising the steps of:

A) establishing a mapping between said plurality of tests and a plurality of directories within a hierarchical directory structure on a storage device, wherein each test of said plurality of tests is mapped to at least one of said plurality of directories;

B) for each given directory within said hierarchical directory that is mapped to one or more of said plurality of tests, performing the steps of:

B1) generating attribute data that specifies attributes associated with said one or more of said plurality of tests;

B2) storing said attribute data in said given directory;

C) receiving input indicating a selected directory of said plurality of directories and a selected attribute;

D) determining whether any tests mapped to said selected directory are associated with said selected attribute;

E) including any tests mapped to said selected directory that are associated with said selected attribute in said subset of tests to run;

F) determining whether any tests mapped to said child directories are associated with said selected attribute; and G) including any tests mapped to said child directories that are associated with said selected attribute in said subset of tests to run.

31. The method of claim 30 further comprising the steps of:

for each given directory within said hierarchical directory that is mapped to one or more of said plurality of tests, performing the steps of:

a) generating pointer data that specifies any directories that correspond to any of said plurality of tests and that are children of said given directory; and b) storing said pointer data in said given directory.

32. The apparatus of claim 31, wherein environment configuration files in one or more directories of said plurality of directories are neither ancestors nor descendants of said first directory or said second directory.

33. An apparatus for performing a test on software in a computer system having a processor, wherein said computer system has an initial environment, the apparatus comprising:

a test base including a plurality of directories connected to form a hierarchical directory structure, wherein a first directory of said plurality of directories corresponds to a first test and a second directory of said plurality of directories corresponds to a second test, said test base further including a plurality of environment configuration files in said plurality of directories, said plurality of environment configuration files including a first set of environment configuration files that apply to said first test but not to said second test, said plurality of environment configuration files including a second set of environment configuration files that apply to said second test but not to said first test, said plurality of environment configuration files including a third set of environment configuration files that apply to both said first test and said second test; and a test engine executed by said processor, wherein said test engine determines which of said plurality of environment configuration files are applicable to said test based on a location of said environment configuration files in said plurality of directories.

34. The apparatus of claim 33, wherein said first set of environment configuration files are ancestors of said first directory but not ancestors of said second directory.

35. The apparatus of claim 33, wherein said second set of environment configuration files are ancestors of said second directory but not ancestors of said first directory.

36. The apparatus of claim 33, wherein said third set of environment configuration files are ancestors of both said first directory and said second directory.

* * * * *